United States Patent [19]

Yamakawa

[11] Patent Number: 4,560,021
[45] Date of Patent: Dec. 24, 1985

[54] CONTROL SYSTEM FOR A PLURALITY OF ENGINE UNITS

[75] Inventor: Toru Yamakawa, Hachioji, Japan
[73] Assignee: Fuji Jukogyo Kabushiki Kaisha, Tokyo, Japan
[21] Appl. No.: 491,329
[22] PCT Filed: Sep. 8, 1982
[86] PCT No.: PCT/JP82/00359
  § 371 Date: Apr. 8, 1983
  § 102(e) Date: Apr. 8, 1983
[87] PCT Pub. No.: WO83/00847
  PCT Pub. Date: Mar. 17, 1983
[30] Foreign Application Priority Data
  Sep. 9, 1981 [JP] Japan .................... 56-142764[U]
[51] Int. Cl.$^4$ ................... B60K 23/00; B60K 5/08
[52] U.S. Cl. .................... 180/54.1; 180/6.48; 180/14.3
[58] Field of Search ............ 180/54.1, 6.48, 14.3

[56] References Cited

U.S. PATENT DOCUMENTS

| | | | |
|---|---|---|---|
| 2,416,640 | 2/1947 | Pinardi et al. | 180/54.1 |
| 2,522,068 | 9/1950 | Stallard | 180/54.1 |
| 3,690,395 | 9/1972 | Spiller et al. | 180/6.48 |
| 4,004,648 | 1/1977 | Joseph et al. | 180/14.3 |

*Primary Examiner*—Richard A. Bertsch
*Attorney, Agent, or Firm*—Martin A. Farber

[57] ABSTRACT

A control system having a plurality of sensors which sense conditions of a vehicle for producing signals, a selection button which selects combinations of the sensed signals and a control device which operates in response to the selected combination of signals to control a clutch to incorporate a plurality of engine units and the output engine torque.

5 Claims, 5 Drawing Figures ns to a control system for
a plurality of engine units provided on a vehicle.

In particular the present invention relates to a control system for a plurality of engine units provided on a vehicle for cooperatively using the engine units under preferable conditions in accordance with driving conditions of the vehicle.

BACKGROUND ART

Generally, an automotive vehicle is driven by a single internal combustion engine such as a gasoline engine or a diesel engine, and the cylinder volume of the internal combustion engine is constant during operation. Since low specific fuel consumption of the internal combustion engine is limited within a small range which is decided by engine torque and engine speed, and since the engine for automotive vehicles is operated under wide driving conditions, the fuel consumption becomes unsatisfactory. In order to eliminate such a disadvantage, there is provided an internal combustion engine comprising a plurality of engine units, which are used in accordance with driving conditions of the vehicle for effectively generating power, whereby the fuel consumption may be improved. For example, Japanese patent publication No. 42-26050 discloses an internal combustion engine, in which a pair of engine units are disposed in parallel and the power of both units is transmitted to an output shaft. Each engine unit is controlled in accordance with load on the engine. However, in such a system it is difficult to use the engine units so as to improve fuel consumption in all conditions of the engine operation.

SUMMARY OF THE INVENTION

The object of the present invention is to provide a control system of a plurality of engine units, having a plurality of sensors for detecting conditions of a vehicle, and having selecting means for manually selecting respective combinations of detected signals from the sensors, and having control means operating in response to the selected combinations of signals to control throttle valves of the engine units and a clutch to use the plurality of engine units.

BEST MODE OF THE INVENTION AND DETAILED DESCRIPTION THEREOF

Figure 1:
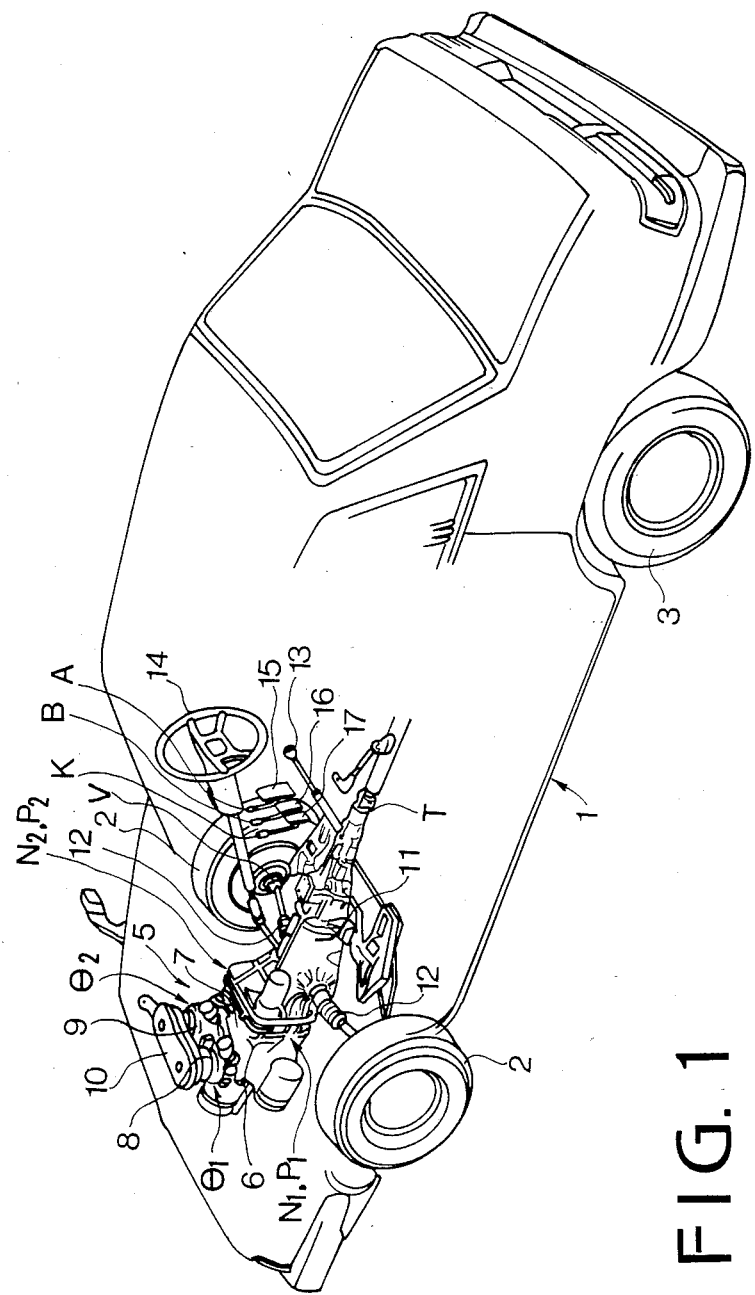
FIG. 1 is a phantom perspective view of an automobile provided with an engine according to the present invention.

FIG. 1 shows a front-mounted engine, front wheel drive type automobile 1 having front wheels 2, rear wheels 3 and an internal combustion engine 5 mounted therein. The internal combustion engine 5 comprises a primary engine unit 6 and an auxiliary engine unit 7, which have carburetors 8 and 9, respectively. A common air cleaner 10 is provided and communicates with the carburetors 8 and 9. A transmission case 11 having a clutch and gear trains is provided on the output side of both engine units 6 and 7. The output of a transmission is transmitted to both front wheels 2 through universal joints 12. A shift lever 13 is provided on the transmission case 11 for gear shift operation. A steering wheel 14 is provided on the right upper portion of the shift lever 13. A common accelerator pedal 15, a brake pedal 16, and a clutch pedal 17 are disposed on the floor of the automobile.

Figure 2:
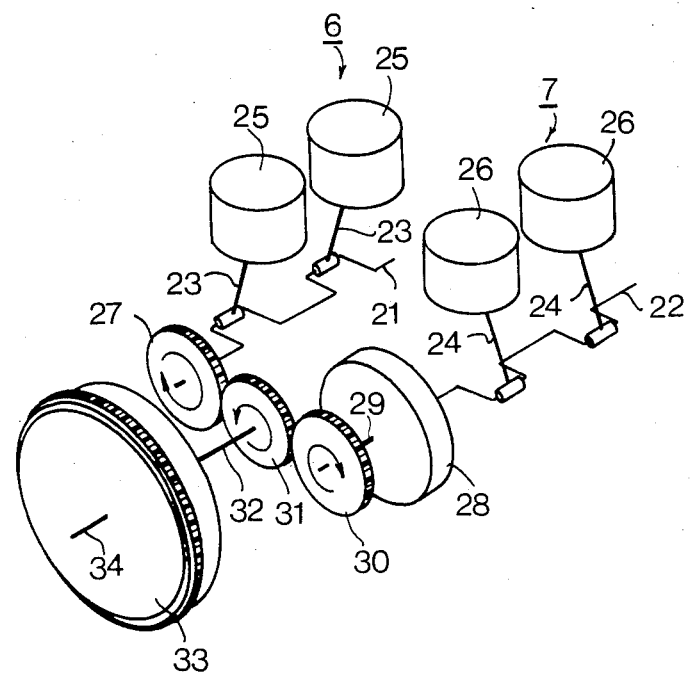
FIG. 2 is a schematic perspective view of the engine.

Referring to FIG. 2, the primary engine unit 6 and auxiliary engine unit 7 each comprises an independent two-cylinder engine having an independent ignition system. A crankshaft 21 of the primary engine unit 6 is driven by operation of a pair of pistons 25 through connecting rods 23 and a crankshaft 22 of the auxiliary engine unit 7 is driven through connecting rods 24 by operation of a pair of pistons 26. A gear 27 is securely mounted on the crankshaft 21. The crankshaft 22 is connected to a shaft 29 through an electromagnetic powder clutch 28. A gear 30 secured to the shaft 29 engages with an output gear 31 which engages with the gear 27. An output shaft 32 of the output gear 31 is secured to a flywheel 33 including a clutch which couples the output shaft 32 with an input shaft 34 of the transmission.

Figure 3:
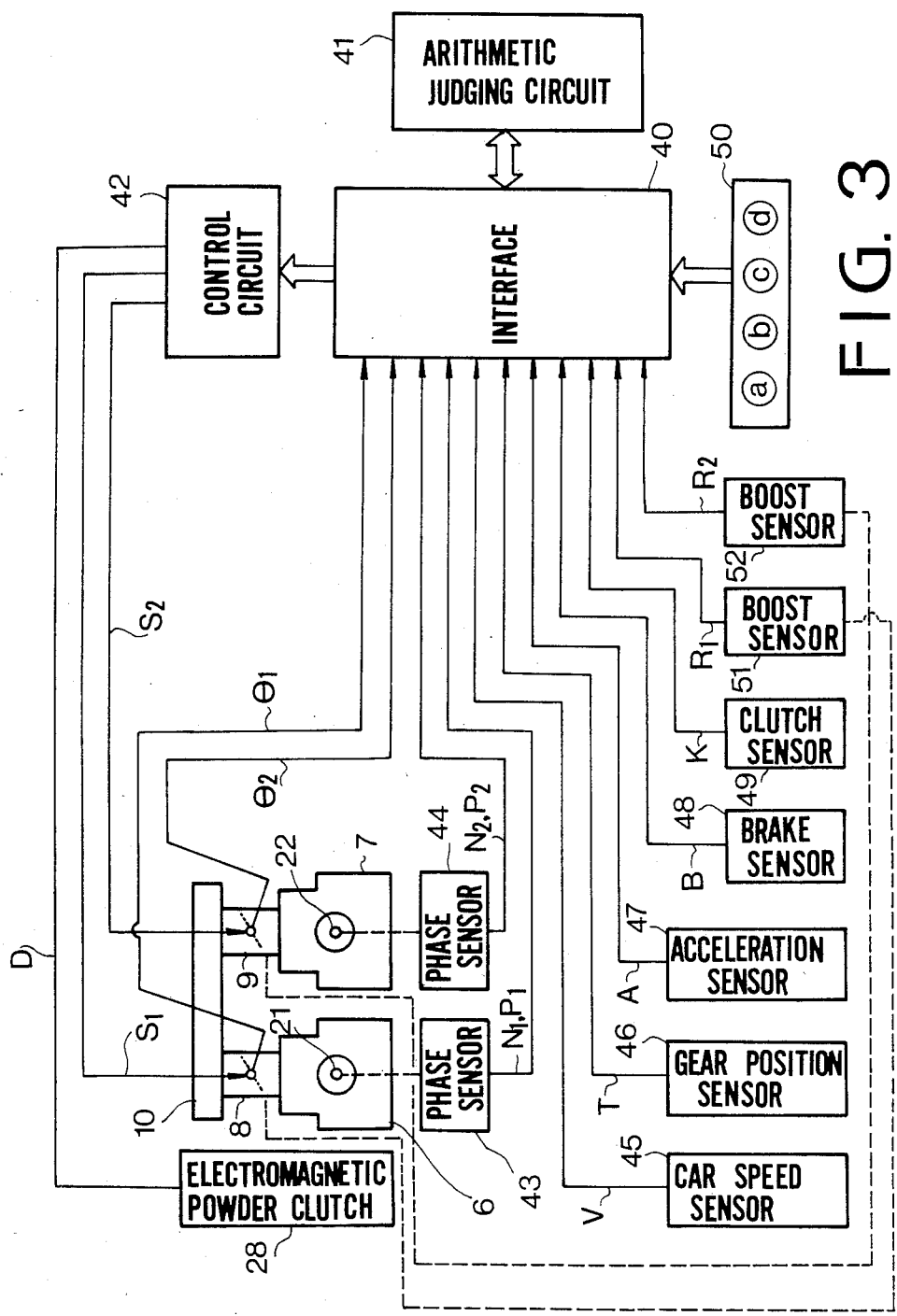
FIG. 3 is a block diagram showing a control system for the engine.

Referring to FIG. 3, the control system comprises an interface 40 applied with various signals, an arithmetic judging circuit 41 for judging these signals and producing corresponding operation signals, a control circuit 42 for driving actuators discussed below, and a setting means having a plurality of set buttons 50 for manually setting a driving condition. The control circuit 42 produces a control signal D for controlling the electromagnetic powder clutch 28, a control signal S1 for controlling a throttle valve of the carburetor 8 and a control signal S2 for controlling a throttle valve of the carburetor 9. Phase sensors 43 and 44 connected to the crankshaft 21 and 22 of the engine units 6 and 7, respectively, produce speed signals N1 and N2, and phase signals P1 and P2, respectively. These signals are applied to the interface 40. Throttle valve position signals $\theta 1$ and $\theta 2$ of the carburetors 8 and 9 also are applied to the interface 40. A car speed sensor 45 provided on the transmission or near the front wheel 2 produces a car speed signal V and a gear position sensor 46 for detecting a gear position (for example first-speed, second-speed . . . ) is provided on the transmission and produces a gear shaft signal T. An acceleration sensor 47 operated by the accelerator pedal 15 produces an acceleration signal A and a brake sensor 48 of the brake pedal 16 produces a brake signal B and a clutch sensor 49 of the clutch pedal produces a clutch signal K. These signals V, T, A, B and K are applied to the interface 40. Boost sensors 51 and 52 provided on intake pipes of the carburetors 8 and 9 produce induction pipe pressure signals R1 and R2 which are applied to the interface 40.

In operation, detected signals from sensors 43-49 are converted or adjusted by the interface 40 and applied to the arithmetic judging circuit 41. The signals are judged in the arithmetic judging circuit 41 under the set conditions and computed with predetermined constants. The result is applied to the control circuit 42 through the interface 40. The control circuit 42 produces corresponding control signals D, S1 and S2 according to instruction signals from the interface 40 for engaging or disengaging the clutch 28 and for controlling the throttle valves of the carburetors 8 and 9. The group of set buttons 50 consists of four manual set buttons a, b, c and d. By selecting and depressing one of the buttons, various signals from the sensors 43-49, 51 and 52 are selected and combined and fed to the arithmetic judging circuit 41 from the interface 40. The combinations provided by the sensors 43-49, 51 and 52 by selecting the buttons a-d are as follows.

Button Signals a. $\theta1, \theta2$, N1, N2, P1, P2, V, T, A, B, K, R1, R2
b. $\theta1, \theta2$, N1, N2, P1, P2, T, A, R1, R2
c. $\theta1, \theta2$, N1, N2, P1, P2, V, A, B, R1, R2
d. $\theta1, \theta2$, N1, N2, P1, P2, R1, R2

Figure 4:
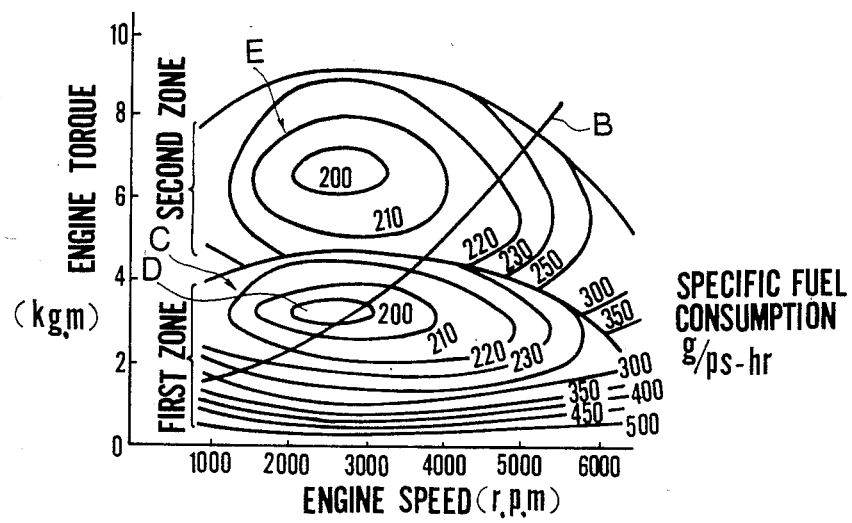
FIGS. 4 and 5 are graphs showing fuel consumption characteristics of the engine.

When the push button a is depressed, signals from all sensors 43-49, 51 and 52 are fed to the arithmetic circuit 41 to control bath engine units 6 and 7 to a most preferable state as described hereinafter. The car speed signal V is zero during idling of the engine. Accordingly, the arithmetic circuit 41 produces a control signal D in dependency on the signal V, and the phase signals P1 and P2 to engage the electromagnetic powder clutch 28. Thus, the engine units 6 and 7 are used in phase to establish a desirable idling operation. In order to increase engine torque at starting or accelerating, the combined power of the first and second engine units 6 and 7 are transmitted to the front wheels 2. Operation for starting the automobile is detected by the fact that the speed signal V is zero and the acceleration signal A and the gear shift signal T are produced. Acceleration at first-speed to third-speed is detected by the gear shift signal T of the gear position sensor 46. When starting or accelerating, the clutch 28 is engaged and the arithmetic judging circuit 41 produces control signals S1 and S2 to control the throttle valves of carburetors 8 and 9 keeping the valves at the same opening degree. The specific fuel consumption, which is established by the engine torque and the engine speed, in such an engine operation is in the third zone of FIG. 5. After acceleration, while the automobile is driven on a flat road at a predetermined speed (for example 50 Km/h) or up a gentle hill at a low acceleration, the automobile 1 is driven by only the first engine unit 6 to improve the fuel consumption characteristics. That is, when the accelerator pedal 15 is slightly released or when the shift lever is changed to the fourth speed (top or overtop), the gear shift signal T and the acceleration signal A change to respective values representing such conditions. According to such signals, the arithmetic judging circuit 41 stops producing the control signal D, so that the clutch 28 is disengaged and only the output torque of the first engine unit 6 is transmitted to the front wheels 2. At the same time, the throttle valve of the carburetor 8 is opened to a predetermined opening degree by the control signal S1 and the throttle valve of the carburetor 9 is closed by the control signal S2. On the other hand, the second engine unit 7 is in the idling state. The fuel consumption characteristic in such an engine operation is in the first zone of FIG. 4. A running load curve B passes through a minimum fuel consumption zone D. Thus, the fuel consumption of the engine is low. Rapid acceleration on a flat road is operated by only the first engine unit 6. However, when driving up a steep hill or overtaking other vehicles, the engine torque must be increased. A rapid acceleration is performed by a rapid depression of the accelerator pedal 15 and an acceleration signal A dependent on such an acceleration is fed to the arithmetic judging circuit 41. The control signal D is produced so that the clutch 28 is engaged to combine both engine torques of the first and second engine units 6 and 7 to accelerate the automobile 1. At the same time, the control signals S1 and S2 are changed to open the throttle valves of both carburetors 8 and 9 at the same opening degree. It will be understood that the timing of the production of the control signals D, S1 and S2 is controlled in dependency on the magnitude of the acceleration. This is obtained by computing the differentiation of the acceleration signal A, namely (dA/dt). In this case, the fuel consumption characteristic is in the second zone of FIG. 4. When driving down a steep hill, the engine brake is operated. It will be noted that if the cylinder volume is large, a large engine brake force is effected. The arithmetic judging circuit 41 judges a driving range, in which the engine braking should be affected by the car speed signal V, gear shift signal T, acceleration signal A, brake signal B and induction pipe pressure signals R1, R2, so that the control signals D, S1 and S2 of the control circuit 42 are produced to engage the clutch 28 and to control the carburetors 8 and 9 for effecting the engine braking.

When the push button b for improvement of the fuel consumption is depressed, the combined signals of sensors 43, 44, 46 and 47 are applied through the interface 40 to the arithmetic judging circuit 41. The arithmetic judging circuit 41 judges mainly the gear shift signal T and the acceleration signal A. The accelerator pedal 15 is depressed at starting, and only the output engine torque of the first engine unit 6 is transmitted to the front wheels 2 so that the vehicle starts quietly. In a low engine torque operation, only the first engine unit 6 is operated. When the accelerator pedal 15 is deeply depressed for a rapid starting or acceleration, an acceleration signal A is generated and control signals D, S1 and S2 of the control circuit 42 are generated to combine the output engine torque of the first and second engine units 6 and 7 to improve the acceleration characteristic. When driving on a flat road and the gear shift signal T changes to fourth-speed, control signal D is cut off in spite of the depression of the accelerator pedal 15, to disengage the clutch 28, so that the automobile is driven by only the first engine unit 6.

The push button c is to insure the safety of the automobile. When the push button c is depressed, the speed signal V of the speed sensor 45, the acceleration signal A of the accelerator sensor 47 and the brake signal B of the brake sensor 48 are fed to the arithmetic judging circuit 41. The first and second engine units 6 and 7 are controlled by the acceleration signal A produced by the depression of the accelerator pedal 15. When the accelerator pedal 15 is slightly depressed, the automobile 1 is driven by the first engine unit 6. When the accelerator pedal 15 is deeply depressed, the automobile 1 is driven by the combined output engine torque of the first and second engine units 6 and 7. When driving on a flat road and the brake pedal 16 is depressed during a high speed driving higher than a predetermined speed, speed signal V and brake signal B dependent thereon are produced. The control signal D of the control circuit 42 engages the clutch 28 for applying the second engine unit 7 to the front wheels 2 to increase the braking operation. If the brake signal B is cut off by releasing the brake pedal 16, or speed is less than a predetermined speed value, the second engine unit 7 is disconnected from the first engine unit 6 and the automobile 1 is driven by the first engine unit 6.

Figure 5:
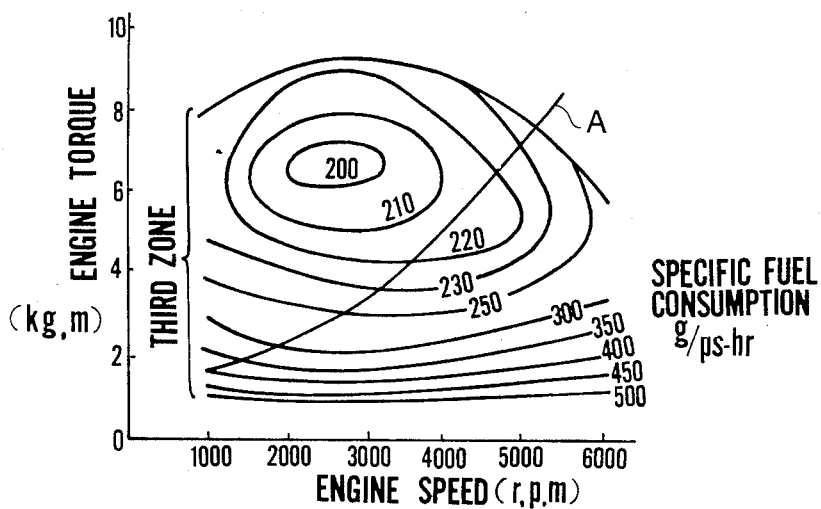

When the push button d is selected, the operational range is in the third zone of FIG. 5. Signals N1, N2, P1 and P2 of the phase sensors 43 and 44 are applied to the arithmetic judging circuit 41. By a signal from the arithmetic judging circuit 41, the control circuit 42 produces a control signal D for continuously engaging the clutch 28. The first and second engine units 6 and 7 are operatively connected to the front wheels 2 through the transmission and the internal combustion engine operates with a preferable acceleration characteristic and at a sufficient engine torque. By depressing the accelerator pedal 15, the control circuit 42 produces control signals S1, S2 to control the carburetors 8 and 9 keeping the throttle valves in the same opening degree.

The present invention is characterized, as described above, in that the control system comprises a plurality of independent engine units including a primary engine unit and at least one auxiliary engine unit, an output shaft for the engine units, a clutch for transmitting the outputs of an engine unit to the output shaft, a plurality of sensors for sensing conditions of operation of the engine and the vehicle, control means for judging signals from the sensors and for producing signals for controlling the throttle valves of the engine units and the clutch, and selecting means for selecting the signals from the sensors for applying selected signals to the control means, whereby the throttle valves and the clutch is controlled by the signals from the control means in accordance with driving conditions of the vehicle.

Various information from a number of sensors is selected in accordance with driving conditions of the vehicle, and a plurality of engine units are used depending on the selected information, so that an effective engine output may be produced.

Since the driver can manually select and set a preferable driving pattern by operating the selective setting means, the vehicle can be driven in accordance with the driving technique of the driver.

I claim:

1. In a control system for an internal combustion engine for a vehicle, the engine having a plurality of independent engine units including a primary engine unit and at least one auxiliary engine unit, an output shaft operatively connected to said engine units, with a clutch for transmitting an output of one of said engine units to said output shaft, the system having a plurality of sensors for sensing conditions of operation of the engine and of said vehicle, the improvement comprising a throttle valve of each of said engine units respectively, control means for judging signals from said sensors and for producing signals for controlling said throttle valve of each of said engine units and said clutch, and.

selecting means for manually selecting said signals from said sensors in accordance with respectively selected driving conditions of said vehicle and for applying the selected signals from said sensors to said control means, such that said throttle valves and said clutch are controlled by said signals from said control means in accordance with the respective selected driving condition of said vehicle.

2. The control system according to claim 1, wherein said selecting means for manually selecting said signals from said sensors in accordance with the respectively selected driving conditions of said vehicle comprises a plurality of manually operated buttons for selecting respective combinations of the signals from said sensors as the selected signals from said sensors.

3. The control system according to claim 1, wherein said clutch is operatively connected between said output shaft and said one engine unit, the latter constituting one of said auxiliary engine units.

4. In a control system for an internal combustion engine for a vehicle, the engine having a plurality of independent engine units including a primary engine unit and at least one auxiliary engine unit, an output shaft operatively connected to said engine units, with a clutch for transmitting an output of one of said engine units to said output shaft, the system having a plurality of sensors for sensing conditions of operation of the engine and of said vehicle, the improvement comprising control means for judging signals from said sensors and for producing signals for controlling the output of said engine and said clutch, and selecting means for selecting said signals from said sensors in accordance with respectively selected driving conditions of said vehicle and for applying the selected signals from said sensors to said control means, such that said output of said engine and said clutch are controlled by said signals from said control means in accordance with the respective selected driving condition of said vehicle.

5. The control system according to claim 4, wherein said sensors comprises phase and speed sensors for each of said engine units, a vehicle speed sensor, a gear position sensor, an acceleration sensor, a brake sensor, a clutch sensor, boost sensors, and throttle valve position sensors.

* * * * *